Sept. 2, 1958     D. D. PEEBLES ET AL     2,850,388
POWDERED CHOCOLATE PRODUCT AND PROCESS OF MANUFACTURE
Filed June 13, 1955
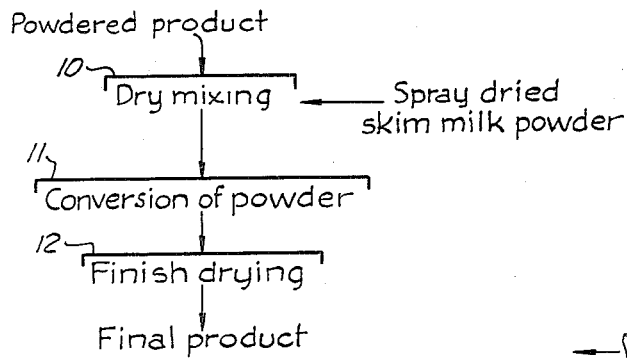
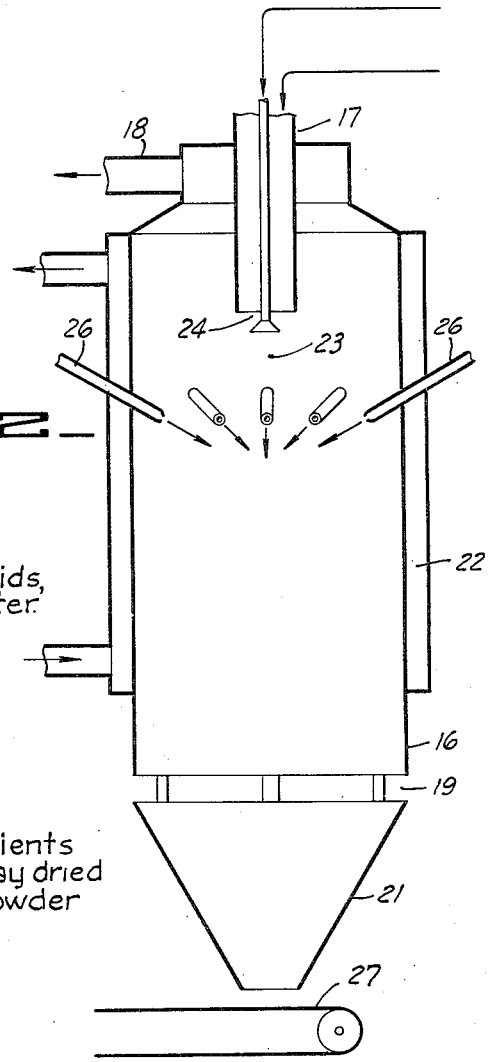
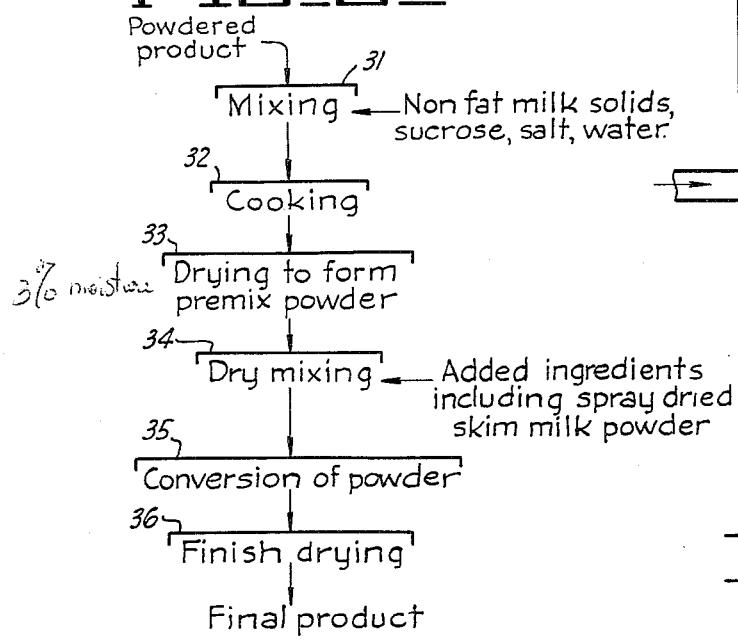
INVENTORS
David D. Peebles
Paul D. Clary, Jr.
BY
ATTORNEYS United States Patent Office 2,850,388
Patented Sept. 2, 1958

2,850,388

POWDERED CHOCOLATE PRODUCT AND PROCESS OF MANUFACTURE

David D. Peebles, Davis, and Paul D. Clary, Jr., Petaluma, Calif., assignors, by mesne assignments, to Instant Milk Company, Los Angeles, Calif., a corporation of Delaware Application June 13, 1955, Serial No. 514,831

13 Claims. (Cl. 99—24)

This invention relates generally to chocolate flavored powdered food products of the type intended to be dispersed in water.

The terms "chocolate" and "cocoa" are applied to a variety of chocolate flavored products derived from the cacao bean. The general practice is to clean and roast the beans, after which the shell and germs are removed. The resulting "cocoa nibs" may be ground to form "chocolate liquor," which is used to make commercial chocolate by the additions of sugar and milk solids. Such chocolate liquor may have a fat content (by legal standards) of from 50 to 58%. Before grinding the nibs, varying amounts of fat can be removed by pressing, and the remaining material ground to form cocoa powder. The more common forms of commercial cocoa contain additives, such as sweetening and vanilla or like flavoring. Of the three types that are generally recognized, breakfast cocoa contains not less than 22% fat, ordinary cocoa contains from 10 to 22% fat, and low-fat cocoa contains less than 10% fat. Chocolate products may likewise be made in dry powdered form, that is as powdered chocolate. Particularly when powdered products derived from the cacao bean contain milk solids, dispersion in water does not occur as quickly or readily as desired. When intermixed with cold water, the particles tend to form sticky lumps. To facilitate dispersion it is customary to form a paste by mixing the powder with a small amount of water, after which the paste is diluted to the concentration desired. It has long been appreciated that it would be advantageous to have a powdered product derived from the cacao bean, containing sweetening and milk solids and capable of ready dispersibility in cold water, without excessive agitation or preliminary mixing to paste form.

In general it is an object of the present invention to provide a product having the desirable characteristics described above.

It is a further object of the invention to provide a product of the above character which may be dispersed in cold water by simple stirring to form an acceptable cocoa or chocolate beverage.

Another object of the invention is to provide a novel process for the manufacture of the above product, which is adapted for low cost quantity production, without injury to heat sensitive components.

Additional objects and features of the invention will appear from the following description in which the preferred embodiments have been set forth in detail in conjunction with the accompanying drawings.

Referring to the drawings:

Figure 1 is a flow sheet illustrating one procedure for the manufacture of our novel powdered chocolate product.

Figure 2 is a schematic view illustrating a suitable apparatus for carrying out conversion of the powder.

Figure 3 is a flow sheet illustrating a more elaborate procedure for the manufacture of a powdered chocolate.

In accordance with the present process we first provide or prepare an initial chocolate flavored product in dry powdered form, which contains material derived from the cacao bean. This initial product is then mechanically intermixed with anhydrous milk solids, such as spray dried skim milk powder. The resulting dry mixture is then processed by a conversion treatment in which the particles are moistened and caused to adhere together. Thereafter the material is subjected to drying to adjust the moisture content to the desired value.

The process will first be described with reference to the manufacture of powdered end product containing sweetening and milk solids and characterized by the fact that it can be readily dispersed in cold water to form a liquid chocolate flavored beverage. Any one of several initial powdered products can be employed, including cocoa powder as described above, or chocolate liquor reduced to powdered form, with or without sweetening, flavor, milk solids or like additives, and with all or only a part of the original fat content.

As indicated in step 10 such an initial powdered product is mechanically intermixed with dry powdered milk solids. Preferably we employ commercial spray dried skim milk powder of good edible quality, such as is produced by conventional commercial spray drying methods. Such a milk powder has a substantial lactose content in anhydrous form, and it is relatively hygroscopic. It has relatively poor wettability and can be dispersed in cold water only after extended mechanical beating or whipping. The particle size may vary from 40 to 120 microns. When such a milk powder is mechanically intermixed with the initial powdered product a homogeneous mixture results in which the skim milk powder particles are brought into intimate contact with the particles of the initial powdered product (i. e. the product derived from the cacao bean).

Sweetening, such as sucrose, can be incorporated in the initial product, or added in powdered form to the dry mix, or both. This also applies to flavoring like vanilla. The initial product may also contain some milk solids.

The mixture from step 10 is then supplied to the conversion step 11, where particles of the dry mix are bonded together. As will be presently explained this conversion operation is carried out by passing the mixture through a zone where the particles are moistened to a sufficient extent to render their surfaces adhesive. In the final step 12 excess moisture is removed from the product to produce a final material having the desired moisture content, without however disturbing the bonds between the particles.

Figure 2 illustrates suitable apparatus which can be used for carrying out the conversion of the powder. This apparatus is similar to that disclosed and claimed in copending application Serial No. 370,420, filed July 27, 1953, in the name of David D. Peebles. It consists of a vertical chamber 16 having a downwardly extending inlet conduit 17 for receiving the powdered mix as conveyed pneumatically from a supply hopper. Some air is removed from chamber 16 through conduit 18 whereby air is drawn into the chamber through the opening 19 between the main part of the chamber and the discharge cone 21. The sides of the chamber can be kept warm by circulating warm air through the jacket 22, thereby preventing the condensing of moisture on the inner chamber surfaces. The free falling powder passes through zone 23 where it is commingled with finely atomized water discharged from nozzle 24. Also some saturated steam can be introduced by way of nozzles 26. The falling powder mix acquires moisture whereby the material discharged on the lower conveyer 27 has a moisture content (total) ranging from about 8% to 20%, about 16.0% being optimum. This moistened powder is subjected to the final finishing drying 12, to produce a final total moisture content suitable for a commercial product, as for example a moisture content of the order of 2.5 to 3.0% (total). The preferred temperature level of the treatment zone 5 is of the order of 80 to 120° F.

As the particles of powder are commingled with the vapor and atomized water, moisture distributes itself on the surfaces of the particles, whereby the particles receive a sufficient amount of moisture to produce pronounced surface stickiness. The particles of skim milk powder which are in contact with the particles of the initial powdered product, as the mixture enters the treatment zone, immediately bond or adhere to the initial particles. In addition the particles of the mix are commingled in the treatment zone in such a manner that random contacts occur between the particles in suspension to cause them to adhere together in the form of aggregates or granules of random shape. The aggregates are made up of one or more particles of the initial product, together with a number of particles of spray dried skim milk powder, and vary in size and shape.

The total time period for the treatment in the equipment of Figure 2 may range from 5 to 60 seconds. The aggregates discharged from the lower end of the equipment are relatively soft and will not stand mechanical handling. They are permitted to rest without handling, as for example on a moving belt, until the structures become firm. The rest period may vary depending upon temperature and moisture conditions, but in a typical instance may be of the order from 1 to 2 minutes. After the period of rest the material is definitely less sticky, it is relatively free flowing, and the aggregates have sufficient strength for handling and drying without serious breakup or crushing.

Treatment in the apparatus of Figure 2 is carried out under such temperature and time conditions as to avoid any substantial increase in the amount of insoluble material in the powder. Assuming that the skim milk employed is of good edible quality having a solubility index of the order of 0.10 or less (American Dried Milk Institute Standards), the temperature, moisture and time factors during treatment in the apparatus of Figure 2, and during finish drying, are controlled in such a manner as to avoid any substantial increase in the solubility index for the milk solids added at 10. Assuming an average temperature in the treatment zone of the order of 100° F., and a total moisture content of the mix of about 16% as it leaves the equipment of Figure 2, it has been found that no noticeable increase in solubility index occurs for a total holding time (including time in the equipment of Figure 2 and during transit to finish drying) approaching about 3 minutes. Initial reduction of moisture content below about 10% in the preliminary part of finish drying makes the powder less susceptible in this respect, whereby thereafter finish drying may proceed over a time period of the order of 10 to 25 minutes.

While various procedures can be used for removing the excess moisture in the finish drying operation 12, it is desirable to avoid such mechanical handling as may cause serious grinding or excessive crushing of the product. Likewise as previously mentioned it is desirable to avoid any substantial increase in the amount of insoluble material in the product, such as coagulated protein. Assuming that the product is dried in contact with air, the temperature of the air can be of the order of 200 to 300° F., from 230 to 270° F. being deemed optimum. The temperature levels and time period of drying can vary inversely, but should be controlled to avoid the creation of undesirable amounts of insoluble material and the creation of foreign flavors due to overheating. The final moisture content of the product can be of the order of 2 to 3% (total).

A desirable drying procedure is to convey the moist material over a screen provided with small perforations, and which is vibrated to cause the material to progress from the feed to the discharge end of the screen, and to apply vertical motion to maintain the powder as a loose working layer. In conjunction with the vibrating action, a warm dry air is delivered upwardly through the screen to pass upwardly through the layer of powder. The number and size of the openings in this screen are so chosen in relation to the rate of air delivery therethrough that the product moving along the screen is fluffed to form a layer several times the thickness it would normally have if at rest. By this technique the product is caused to progress along the screen and is at least partially supported by the cushion of air intermingled therewith. This provides drying action without rough mechanical handling which might break up the powder aggregates. A small amount of relatively fine sized powder is carried away from the drier in the drying air. As will be presently explained such material can be returned to the process.

As previously pointed out the conversion operation 11 serves to establish bonds between the particles of skim milk powder and the particles of initial powdered product, and in addition aggregates are formed of random shape, which incorporate one or more particles of the initial product. Although the lactose content of the spray dried skim milk powder supplied to the mixing operation 10 is in anhydrous or amorphous form, it is mostly in stable crystallized form (alpha monohydrate) in the final end product. It has been found desirable to supply to the mixing operation 10, not only spray dried skim milk powder, but in addition a small amount of powdered crystallized lactose (alpha lactose monohydrate). As a source of such lactose we can employ the fine powder recovered from the finished drying operation 12 as described above, or we can employ finely divided spray dried skim milk powder which has been treated to convert its lactose content to crystallized form.

The proportioning between the initial powdered product and the spray dried skim milk powder supplied to the mixing operation 10 can vary considerably. For example for each 100 pounds of mix, we can employ from 24 to 36 pounds of initial product with from 64 to 76 pounds of skim milk powder. From 5 to 20% of the spray dried skim milk powder can consist of skim milk powder having its lactose content in crystallized form.

The product made according to the process outlined above has a number of desirable characteristics. One characteristic is that it has relatively high wettability. Thus when a spoonful of the product is dropped into a tumbler containing a quantity of cold water, it floats upon the surface for only a short time, and then progressive sinking occurs. After sinking the contents of the tumbler can be agitated as by simple stirring to effect a complete dispersion to form a homogeneous liquid beverage. Stirring or agitation does not cause formation of sticky lumps. In a typical instance about 5 seconds is required for 10 grams of the product to sink in 100 cc. water at a temperature of 70° F., in a 600 cc. flask. After sinking stirring with a spoon for about 10 seconds resulted in complete dispersion.

As previously explained conventional powdered products of the cocoa and chocolate type do not have high wettability in cold water, and it is customary to premix such products with a small amount of water to form a paste, before dispersion in hot water. Such undesirable characteristics are completely eliminated in our product. Thus with the present product one can quickly form a beverage by direct mixing with the final desired amount of either hot or cold liquid. Dispersion in water not only occurs with respect to the initial product supplied to the process, but also with respect to the milk solids, including the milk solids added by way of the spray dried skim milk powder in the mixing operation 10.

Another characteristic of our product is that it has good flavor characteristics, which is attributed to the fact that the desirable flavor characteristics derived from the cacao bean are not impaired during processing, or by the added spray dried skim milk powder.

A further characteristic of the product is that it is non-hygroscopic, and therefore need not be marketed in sealed containers. The major part of the lactose content is hydrated and in the form of alpha lactose monohydrate, which renders the product stable with respect to atmospheric moisture. Also it is free flowing, and therefore can be marketed in containers having a pouring spout similar to conventional salt cartons.

The product has a uniform brown color, of a shade slightly lighter than the initial powder employed.

The solubility index of the final product is largely a factor of the solubility index of components present in the initial product employed. For typical final products the solubility index may be from 1.5 to 2.0.

The particle size of the final product will depend upon sizing operations which may be carried out immediately after final drying. A screen anlysis of a typical product can be as follows:

|  | Percent |
| --- | --- |
| On 20 mesh screen | Trace |
| On 60 mesh screen | 60.7 |
| On 80 mesh screen | 23.2 |
| On 100 mesh screen | 6.1 |
| On 140 mesh screen | 5.8 |
| Through 140 mesh screen | 4.2 |

The flow sheet of Figure 3 illustrates a more specific procedure for carrying out of the process. In this instance cocoa (i. e. ground cocoa nibs from which some fat has been removed) is supplied to the wet mixing operation 31, where it is mixed with non-fat milk solids, a sweetening like sucrose, a flavoring like salt, and water. The non-fat milk solids may be skim milk in either concentrate or powder form. In a typical instance a formula can be employed as follows:

*Formula No. 1A*

|  | Pounds |
| --- | --- |
| Cocoa (15% fat content) | 9.0 |
| Skim milk solids (dry basis) | 12.5 |
| Sucrose | 8.0 |
| Salt (NaCl) | 0.5 |
| Lecithin | 0.25 |
| Water | 45.35 |

The above Formula No. 1A provides a liquid mix containing about 40% solids. The sucrose provides a part of the sweetening for the final product. The lecithin insures dispersion of the fat content both in the wet mix, and when the final product is dispersed in water.

The wet mix produced in step 31 is subjected to cooking 32 at a temperature of the order of 170° F. for a suitable period such as about 15 minutes. This forms a homogeneous cooked material which is then subjected to drying to produce a "pre-mix" powder. The moisture content of this powder can be about 3% (total). The drying equipment employed can be of the drum or roll type, or a suitable spray drier can be employed. This initial powder (or pre-mix) is then dry mixed at 34 with additional ingredients, including particularly spray dried anhydrous skim milk powder as previously described. As a specific example of proportioning, 30 pounds of pre-mix from step 33 can be mixed with about 44 pounds of spray dried skim milk powder in step 34.

In addition to the skim milk powder, we supply powdered (i. e. finely divided) lactose in the form of alpha lactose monohydrate, the amount ranging from about 2 to 5% of the added skim milk powder. Further additives can include the addition of sucrose, vanilla sugar and a suitable stabilizer. Various stabilizers can be used such as starches, gums and gelatin. Particular reference can be made to rice starch of the pre-gelatinized type which has been used with good results. Assuming use of the above Formula No. 1A to provide the pre-mix powder, the ingredients supplied to step 34 can be as follows:

*Formula No. 2A*

|  | Pounds |
| --- | --- |
| Pre-mix powder | 30.25 |
| Spray dried skim milk powder | 44.00 |
| Sucrose | 28.00 |
| Vanilla sugar | 1.00 |
| Pre-gelatinized rice starch | 0.32 |
| Powdered lactose | 3.00 |

The above Formulas Nos. 1A and 2A provide an overall proportioning as follows:

*Formula No. 3A*

|  | Pounds |
| --- | --- |
| Cocoa | 9.0 |
| Skim milk solids | 56.5 |
| Sucrose | 36.0 |
| Salt (NaCl) | 0.5 |
| Vanilla sugar | 1.0 |
| Pre-gelatinized rice starch | 0.32 |
| Lecithin | 0.25 |
| Powdered lactose | 3.0 |

Instead of introducing all of the cocoa into the pre-mix, a part can be introduced into the dry mix. Thus, by way of example, the above Formulas 1A, 2A and 3A can be modified as follows:

*Formula No. 1B*

|  | Pounds |
| --- | --- |
| Cocoa (15% fat content) | 9.0 |
| Skim milk solids (dry basis) | 17.0 |
| Sucrose | 6.0 |
| Salt (NaCl) | 0.5 |
| Lecithin | 0.25 |
| Water | 46.75 |

The above was cooked and dried as previously described to produce a pre-mix powder. About 30 pounds of the this pre-mix was dry mixed with a second formula modified as follows:

*Formula No. 2B*

|  | Pounds |
| --- | --- |
| Pre-mix powder | 31.25 |
| Cocoa (15% fat content) | 1.5 |
| Spray dried skim milk powder | 39.5 |
| Sucrose | 30.0 |
| Vanilla sugar | 1.0 |
| Pre-gelatinized rice starch | 0.32 |
| Powdered lactose | 1.0 |

The above Formulas 1B and 2B provided an overall proportioining as follows:

*Formula No. 3B*

|  | Pounds |
| --- | --- |
| Cocoa | 9.0 |
| Skim milk solids | 56.5 |
| Sucrose | 36.0 |
| Salt (NaCl) | 0.5 |
| Vanilla sugar | 1.0 |
| Starch | 0.32 |
| Lecithin | 0.25 |
| Powdered lactose | 1.0 |

The dry mix from step 34 is then supplied to the conversion step 35, which can be carried out in the same manner as step 11 of Figure 1. Following step 35 the material is subjected to finish drying 36, corresponding to the step 12 of Figure 1, to produce the final product.

The product produced in accordance with the procedure described with reference to Figure 3 has the characteristics previously described with reference to Figure 1. The preparation of a cooked pre-mix in the manner described facilitates production of a product to a high degree of uniformity and with the desired color and flavor characteristics. By adjusting the amount of sucrose used in the preparation of the pre-mix, it is possible to control the friability of the finished product. Thus the pre-mix may consist of from 16 to 27% sucrose, and the milk solids 33 to 60% when the pre-mix represents from 27 to 41% of the total dry mix. Amounts of sucrose beyond the 27% mentioned above cause excessive stickiness in the converter, whereas at levels below 16% the aggregates formed in the converter were too fragile. This factor of control can be utilized to obtain a product having the desired characteristics irrespective of plant location or the particular type of processing equipment employed.

It will be evident that the invention is susceptible of many modifications and embodiments. While the product described above is intended primarily for the preparation of a cold or hot beverage, it can be used for other purposes, such as a base ingredient for the preparation of puddings, ice cream mixes, cake icings or frostings, and for other purposes where it is desired to provide a chocolate type flavoring together with milk solids. By providing sufficient pre-gelatinized starch or other stabilizer, the product can be used for the preparation of a chocolate flavored pudding. For example, Formulas Nos. 2A and 2B can be modified by increasing the amount of pre-gelatinized starch from 0.32 pound to about 1.5 pounds. As is well known to those familiar with this ingredient, it is capable of forming a stable jell in cold water and, therefore, when such a modified product is dispersed in water the pregelatinized starch rapidly sets up to form a pudding.

As previously mentioned, the fat content of the cocoa employed may vary. When a product is desired having a low fat content the cocoa may for example have a fat content ranging from 12 to 22%. Higher fat content cocoa serves to enrich the final product. The natural retained fat content of the cocoa can be supplemented with an added fat, such as butterfat, or other fats of vegetable or animal origin, such as hydrogenated cottonseed oil. Such added fat is introduced into the pre-mix before drying. Butterfat can be added to the pre-mix by using whole milk in place of part or all of the skim milk solids at this point.

The terms "chocolate flavored product" and "chocolate flavored powder" as used in the foregoing specification and in the appended claims have reference to products flavored by the presence of material derived from the cacao bean, irrespective of its fat content or the presence of additives.

We claim:

1. In a process for the manufacture of a chocolate flavored dry powdered food product characterized by high wettability and dispersibility in water, forming a mixture of a chocolate flavored powder with moist sticky anhydrous milk powder, and causing the sticky particles of milk powder to cohere with the particles of the chocolate flavored powder in the form of random aggregates of a size substantially greater than the size of the original particles.

2. In a process for the manufacture of a chocolate flavored powdered food product characterized by high wettability and dispersibility in water, the steps of mechanically mixing an initial chocolate flavored powder with anhydrous milk powder, applying moisture to the mixture while in dispersed condition to cause the particles of milk powder to be made sticky, commingling the material to cause the material to adhere together in the form of moist random aggregates including both the chocolate flavored and milk powder particles, said aggregates being of a size substantially greater than the size of the original particles, and then removing excess moisture from such aggregates.

3. A process as in claim 2 in which the initial chocolate flavored powder includes milk solids and sweetening.

4. A process as in claim 2 in which the initial chocolate flavored powder includes material derived from the cacao bean which has been cooked with milk solids, sweetening and water, and thereafter dried to form a powder.

5. In a process for the manufacture of a chocolate flavored product in dry powdered form, cooking a wet mix including material derived from the cacao bean, sucrose, milk solids and water, drying the material to form a pre-mix powder, dry mixing such powder with anhydrous skim milk powder and alpha lactose monohydrate, causing the dry mix to progress in dispersed condition through a treatment zone to which moisture is supplied whereby the particles are moistened and rendered sticky, causing the material while dispersed to be commingled whereby particles are contacted and caused to adhere in the form of aggregates, such aggregates being of a size substantially greater than the size of the original particles, and then removing excess moisture from the aggregates without substantial crushing of the same.

6. A process as in claim 5 in which sucrose is supplied to the dry mixing operation together with the skim milk powder and the lactose.

7. A process as in claim 5 in which sucrose and lecithin are supplied to the dry mixing operation together with the skim milk powder and lactose.

8. A process as in claim 5 in which a stabilizer starch is added to the dry mixing operation together with the skim milk powder and lactose.

9. In a process for the manufacture of a chocolate flavored product in dry powdered form, cooking a wet mix including material derived from the cacao bean together with sucrose, milk solids and water, drying the mix to form a pre-mix powder, the amounts of sucrose and milk solids employed being such that the sucrose is within the limits of about 16 to 27% and the milk solids from about 33 to 60%, dry mixing such powder with anhydrous skim milk powder and alpha lactose monohydrate, the amount of pre-mix used in the dry mixing operation being such that the pre-mix represents from about 27 to 41% of the total mix, causing the dry mix while dispersed to be moistened and the particles rendered sticky and caused to adhere in the form of aggregates, of a size substantially greater than that of the original particles and then removing excess moisture from the aggregates to form the final product.

10. As a new article of manufacture, a chocolate flavored powdered food product in the form of aggregates characterized in that it is free flowing, nonhygroscopic, and readily dispersible in cold water to form a chocolate flavored beverage.

11. As a new article of manufacture, a powdered product consisting of particles containing material derived from the cacao bean together with sucrose and milk solids, said particles being bonded with particles of hydrated skim milk solids to form aggregates of a size substantially greater than that of the original particles, said product being characterized in that it is free flowing, nonhygroscopic, and readily dispersible in cold water to form a chocolate flavored beverage.

12. A method for the manufacture of a dry food product, comprising continuously moistening a mixture of chocolate flavored powder and anhydrous milk powder while the material is in dispersed condition, causing the moistened particles of the material while dispersed in a treatment zone to contact and permanently adhere together in the form of light moist random aggregates of random shape and of a size substantially greater than the size of the original particles, the aggregates leaving said zone in dispersed condition and having a total moisture content of from 8 to 20 percent, and then removing excess moisture from the aggregates without any substantial amount of crushing of the same, the final product being a free-flowing granular material.

13. A dry food product comprising aggregates, the aggregates consisting of smaller particles of dry milk powder together with smaller particles of chocolate flavored powder, the particles being firmly adhered together in random fashion to form a free-flowing, divided material, the majority of the aggregates having a size such that they will not pass through a 60 mesh screen, the chocolate flavored powder comprising mainly cocoa, skim milk solids, and sucrose, with sucrose comprising from about 16 to 27 percent of the total ingredients of the chocolate flavored powder, the product being free-flowing and non-hygroscopic and characterized by high wettability and its ability to disperse in water by simple stirring to form a stable, reconstituted chocolate flavored product.

References Cited in the file of this patent

UNITED STATES PATENTS

| | | |
|---|---|---|
| 668,253 | Campbell | Feb. 19, 1901 |
| 1,689,029 | Heyman | Oct. 23, 1928 |
| 1,937,527 | Otting | Dec. 5, 1933 |
| 2,016,592 | Chuck | Oct. 8, 1935 |
| 2,174,734 | Chuck | Oct. 3, 1939 |
| 2,399,565 | North et al. | Apr. 30, 1946 |